(12) United States Patent
Isii et al.

(10) Patent No.: US 6,292,975 B1
(45) Date of Patent: Sep. 25, 2001

(54) WIPER UNIT

(75) Inventors: Yosinori Isii; Yukiho Murata; Koji Ito, all of Yokohama (JP)

(73) Assignee: Jidosha Denki Kogyo Kabushiki Kaisha, Kanagawa-Prefecture (JP)

( * ) Notice: Subject to any disclaimer, the term of this patent is extended or adjusted under 35 U.S.C. 154(b) by 0 days.

(21) Appl. No.: 09/280,824

(22) Filed: Mar. 30, 1999

(30) Foreign Application Priority Data

Mar. 30, 1998 (JP) .................................................. 10-084254

(51) Int. Cl.⁷ .................................. B60S 1/16; B60S 1/18
(52) U.S. Cl. ...................... 15/250.31; 15/250.3; 296/192; 296/96.17
(58) Field of Search ............................... 15/250.31, 250.3, 15/250.27, 250.14; 296/96.17, 96.45, 192; 74/606 R, 42, 43

(56) References Cited

U.S. PATENT DOCUMENTS

| 5,074,613 | * | 12/1991 | Unterborn | 15/250.31 |
|---|---|---|---|---|
| 5,203,602 | * | 4/1993 | Eustache | 296/96.15 |
| 5,222,706 | * | 6/1993 | Hoshino | 15/250.31 |
| 5,441,227 | * | 8/1995 | Hayashi | 15/250.31 |
| 5,878,631 | * | 3/1999 | Muehlpforte et al. | 15/250.31 |
| 5,956,800 | * | 9/1999 | Morin et al. | 15/250.31 |

FOREIGN PATENT DOCUMENTS

| 2529949 | * | 8/1976 | (DE) | 15/250.3 |
|---|---|---|---|---|
| 2621287 | * | 4/1989 | (FR) | 15/250.3 |
| 2640211 | * | 6/1990 | (FR) | 15/250.31 |
| 2227926 | * | 8/1990 | (GB) | 15/250.3 |
| 9-39742 | | 2/1997 | (JP) . | |

* cited by examiner

Primary Examiner—Gary K. Graham
(74) Attorney, Agent, or Firm—Sughrue, Mion, Zinn, Macpeak & Seas, PLLC

(57) ABSTRACT

A wiper unit comprises a wiper motor provided with a motor yoke and a gear case screwed to the motor yoke, a motor arm, a wiper frame, a pivot shaft, a pivot arm and a link connecting rod. The gear case of the wiper motor is formed with a frame-holder portion having a semi-circular cross section to be fitted with the wiper frame for supporting the wiper frame, and the wiper frame is secured to the frame-holder portion of the gear case by, for example, tightening a screw.

3 Claims, 6 Drawing Sheets

WIPER UNIT

BACKGROUND OF THE INVENTION

1. Field of the Invention

This invention relates to a wiper apparatus for wiping a windshield of a motor vehicle and more particularly, to a wiper unit provided with a wiper motor, a wiper arm, a pivot shaft, a pivot arm and a link connecting rod incorporatedly.

2. Description of the Prior Art

A wiper apparatus disclosed in non-examined Japanese Patent Publication Hei No.9-39742 (FIG. 2) has been known as a wiper unit incorporatedly provided with a wiper motor, a wiper arm, a pivot shaft, a pivot arm and a link connecting rod.

In the aforementioned wiper unit, the wiper motor is fixed with a bracket formed independently form the wiper motor, and a tubular shaped wiper frame is fixed to the bracket, accordingly there is the possibility of looseness at either in a connected portion between wiper motor and bracket or a connected portion between bracket and wiper frame and there is a problem in that deterioration in quality may be caused by the mechanical vibration on basis of the looseness in the connected portion.

SUMMARY OF THE INVENTION

It is, therefore, an object of this invention to provide a wiper unit which is possible to firmly connect the wiper frame with the wiper motor without slackness by directly connecting between the wiper motor and the wiper frame.

The construction of the wiper unit according to this invention for achieving the above-mentioned object is characterized by comprising a wiper motor provided with an armature rotating in a motor yoke, a gear case screwed to the motor yoke, and an output shaft connected with the armature through a reduction gear; a motor arm fixed to the output shaft of the wiper motor; a wiper frame having a tubular shaped frame body, a body-fixation part to be fixed to the vehicle body at an end of the frame body, and a pivot shaft holder; a pivot shaft rotatably supported by the pivot shaft holder of the wiper frame; a pivot arm secured to the pivot shaft; and a link connecting rod rotatably connected with the motor arm and the pivot arm, respectively; wherein the frame body of the wiper frame is provided with a case-fixing portion; and the gear case of the wiper motor is provided with a frame-holder portion with a semi-circular cross section to be fitted with the case-fixing portion of the wiper frame for supporting the wiper frame at the case-fixing portion.

The wiper frame may be secured to the gear case of the wiper motor by tightening a screw passed through a screw hole formed in the case-fixing portion of the wiper frame into a threaded hole formed in the frame-holder portion of the gear case, or caulking a rivet passed through a rivet hole formed in the case-fixing portion of the wiper frame and a rivet through hole formed in the frame-holder portion of the gear case in a preferred embodiment of this invention.

A wiper unit according to another embodiment of this invention may be further provided with a frame cover fixed on the case-fixing portion of the wiper frame for substantially covering the whole circumference of the case-fixing portion together with the frame-holder portion of the gear case.

In a wiper unit according to the other preferred embodiment, both ends of the frame cover may be slightly separated from the frame-holder portion of the gear case.

Further in a wiper unit according to the other desirable embodiment of this invention, the frame-holder portion of the gear case may be provided with cutouts for receiving both ends of the frame cover, respectively.

In the wiper unit according to this invention, the frame body of the wiper frame is provided with the case-fixing portion, and the gear case of the wiper motor is provided with a frame-holder portion for supporting the wiper frame at the case-fixing portion, and the wiper frame is directly fixed to the gear case without any intermediate member by, for example, tightening the screw passed through the screw hole formed in the case-fixing portion of the wiper frame into the threaded hole formed in the frame-holder portion of the gear case, or caulking the rivet passed through the rivet holes formed in the case-fixing portion of the wiper frame and the frame-holder portion of the gear case. Therefore, the wiper frame is secured firmly by the resiliency without looseness since the wiper frame is supported by the frame-holder portion and deformation of the wiper frame caused by tightening the screw or caulking the rivet is restrained in some degree by the frame-holder portion having the semi-circular cross section to be fitted with the case-fixing portion of the wiper frame.

In the wiper unit according to another embodiment of this invention, which is further provided with the frame cover fixed on the case-fixing portion of the wiper frame, the wiper frame is secured to the frame-holder portion of the gear case in a state where the whole circumference of the case-fixing portion is substantially covered by the frame cover and the frame-holder portion of the gear case, therefore the wiper frame is further firmly secured by the resiliency to the gear case because the deformation of the wiper frame is restrained by the frame-holder portion and the frame cover.

In the wiper unit according to the other embodiment of this invention, both ends of the frame cover are slightly separated from the frame-holder portion of the gear case, therefore the frame cover is never contact with the gear case at the time of fixing the wiper frame to the frame-holder portion of the gear case and the resiliency of the wiper frame works efficiently for combining between the wiper frame and the gear case.

Further in the wiper unit according to the other embodiment, the frame-holder portion of the gear case has cutouts to receive respective ends of the frame cover, therefore the frame cover is prevented from the deformation by the cutout of the frame-holder portion at the time of tightening the screw or caulking the rivet and the wiper frame is further firmly secured to the gear case.

DESCRIPTION OF THE PREFERRED EMBODIMENT

Figure 1:
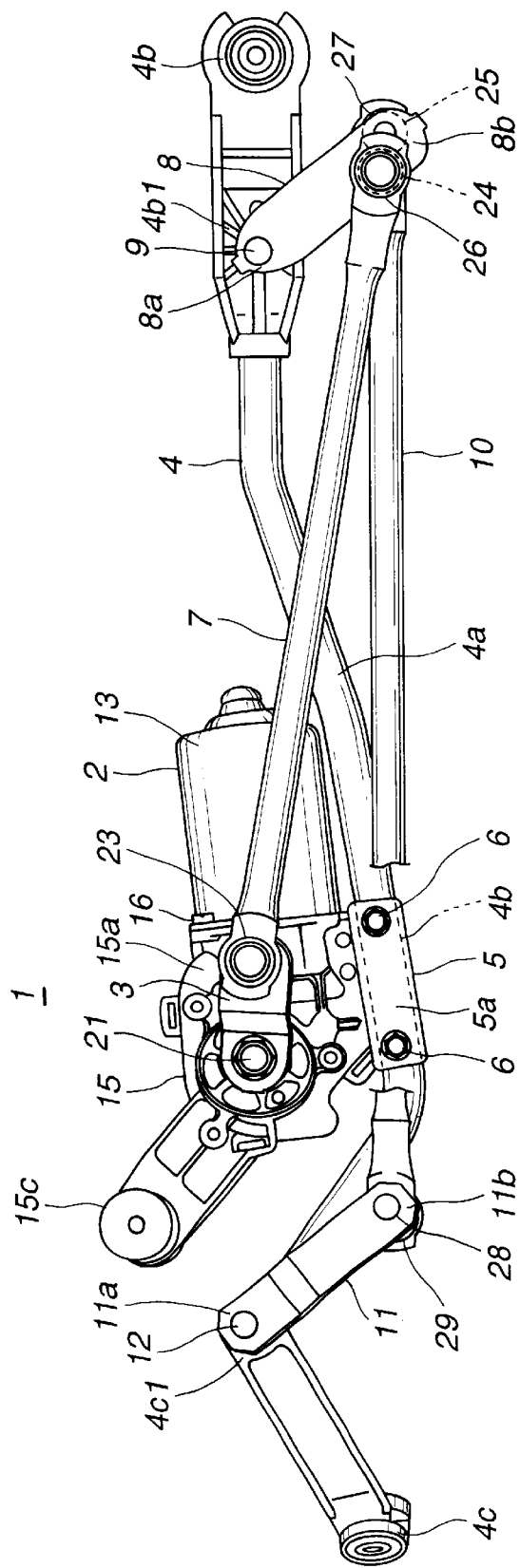
FIG. 1 is a partially cutaway top plan view illustrating a first embodiment of the wiper unit according to this invention.
Figure 2:
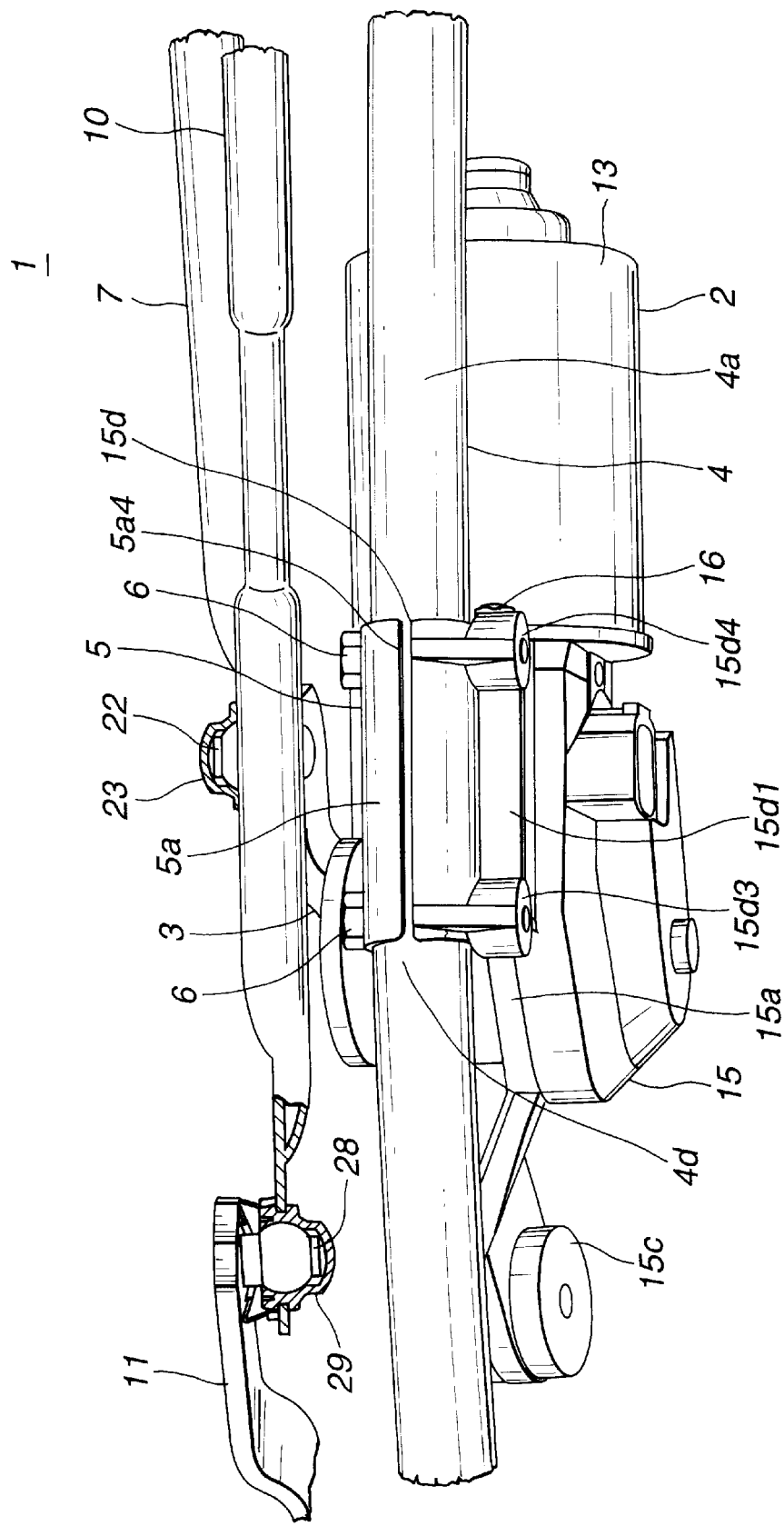
FIG. 2 is a front view illustrating the vicinity of the wiper motor of the wiper unit shown in FIG. 1.

This invention will be explained below in reference to the drawings.

A wiper unit according to the first embodiment of this invention is shown in FIGS. 1 to 4.

The wiper unit 1 is mainly composed of a wiper motor 2, a motor arm 3, a wiper frame 4, a frame cover 5, screws 6 for fixing the wiper frame 4, a first link connecting rod 7, a first pivot arm 8, a first pivot shaft 9, a second link connecting rod 10, a second pivot arm 11, and a second pivot shaft 12.

Figure 3:
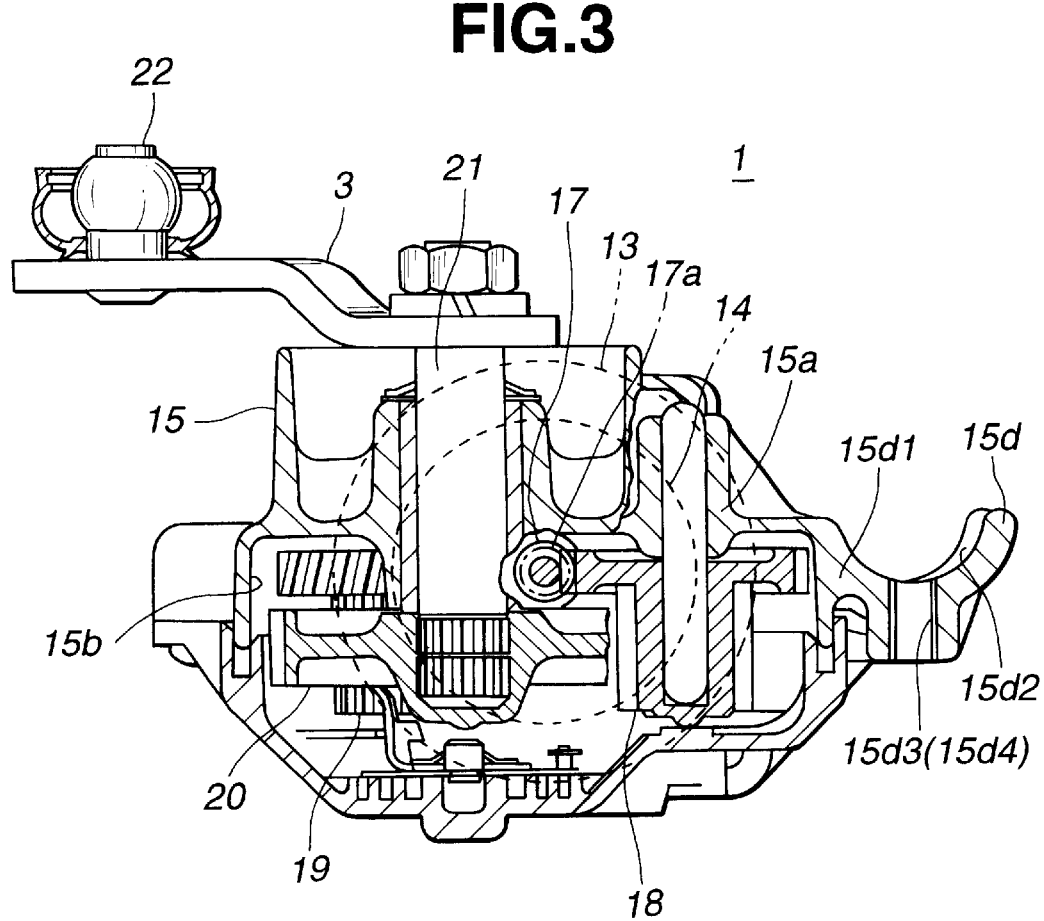
FIG. 3 is a section view illustrating structure of the gear case of the wiper motor in the wiper unit shown in FIG. 1.

The wiper motor 2 is provided with a motor yoke 13 in which an armature 14 is rotatably housed and a gear case 15 which is connected with the motor yoke 13 by tightening a screw 16. The armature 14 is provided with an armature shaft 17, which is disposed in a state of protruding into a gear housing 15b formed in a case body 15a of the gear case 15 from the motor yoke 13 as shown in FIG. 3.

The armature shaft 17 is formed with a worm 17a at the top end protruding in the gear housing 15b, and the worm 17a is meshed with a first intermediate gear 18 and a second intermediate gear 19, respectively. The first and the second gears 18 and 19 are double gears, the larger gears are meshed respectively with the worm 17a of the armature shaft 17 and the smaller gears are meshed with an output gear, respectively.

The output gear 20 is combined to one end of an output shaft 21 rotatably supported by the gear case 15. Another end of the output shaft 21 protrudes on the outside of the gear case 15 and is secured to a base end of the motor arm 3. The motor arm 3 is fixed with a first ball pin 22 at the free end thereof. The first ball pin 22 is connected with a first ball retainer 23 through a spherical pair. The first ball retainer 23 is fixed to one end of the first link connecting rod 7.

The gear case 15 is formed with a first body-fixation part 15c and a frame-holder portion 15d. The body-fixation part 15c is formed in a plate-like shape and projects from the case body 15a. The frame-holder portion 15d has a rectangular shape and is formed protrudingly.

The frame-holder portion 15d is provided with a first frame-contact face 15d2 formed in a groove-like shape having a semi-circular cross section with the inside diameter slightly larger than the outside diameter of a case-fixing portion 4d of the wiper frame 4 (described later) on one side of a holder body 15d. Furthermore, the frame-holder portion 15d is formed with a first threaded hole 15d3 and a second threaded hole 15d4 lined up in the direction of the groove at the center of the frame-contact face 15d2, respectively. Although interior screws are formed in the threaded holes 15d3 and 15d4, through holes may be formed simply without forming the threaded holes by using tapping screws or so instead of the screws 6 described later.

In the frame-holder portion 15d, the case-fixing portion 4d of the wiper frame 4 is disposed on the first frame-contact face 15d2 and pressed onto the frame-contact face 15d2 by tightening the screws 6,6 passed through the case-fixing portion 4d into the first and second threaded holes 15d3 and 15d4. The first frame-contact face 15d2 is so designed as to cover a lower half portion of the circumference of the case-fixing portion 4d in the longitudinal direction of the case-fixing portion 4d of the wiper frame 4.

In the wiper motor 2, the armature shaft 17 rotates by exciting the armature 14 through the external circuit (not shown), the first and second intermediate gears 18, 19 are rotated through the worm 17a of the armature shaft 17 on basis of the rotation of the armature shaft 17, and the output gear 20 is rotated through the first and second intermediate gears 18, 19, thereby rotating the motor arm 3 together with the output shaft 21 secured with the output gear 20. According to the rotation of the motor arm 3, the first ball pin 22 fixed to the end of the motor arm 3 moves on a circle, whereby the first link connecting rod 7 is given with reciprocative oscillating motion through the first ball retainer 23.

On the other side, the wiper frame 4 is composed of a frame body 4a, a second body-fixation part 4b and a third body-fixation part 4c.

The frame body 4a has a tubular shape and is formed by bending in a form to be fitted with that of the dash upper panel of the vehicle body on which the present wiper unit is to be mounted. The case-fixing portion 4d is formed in the center of the frame body 4a.

Figure 4:
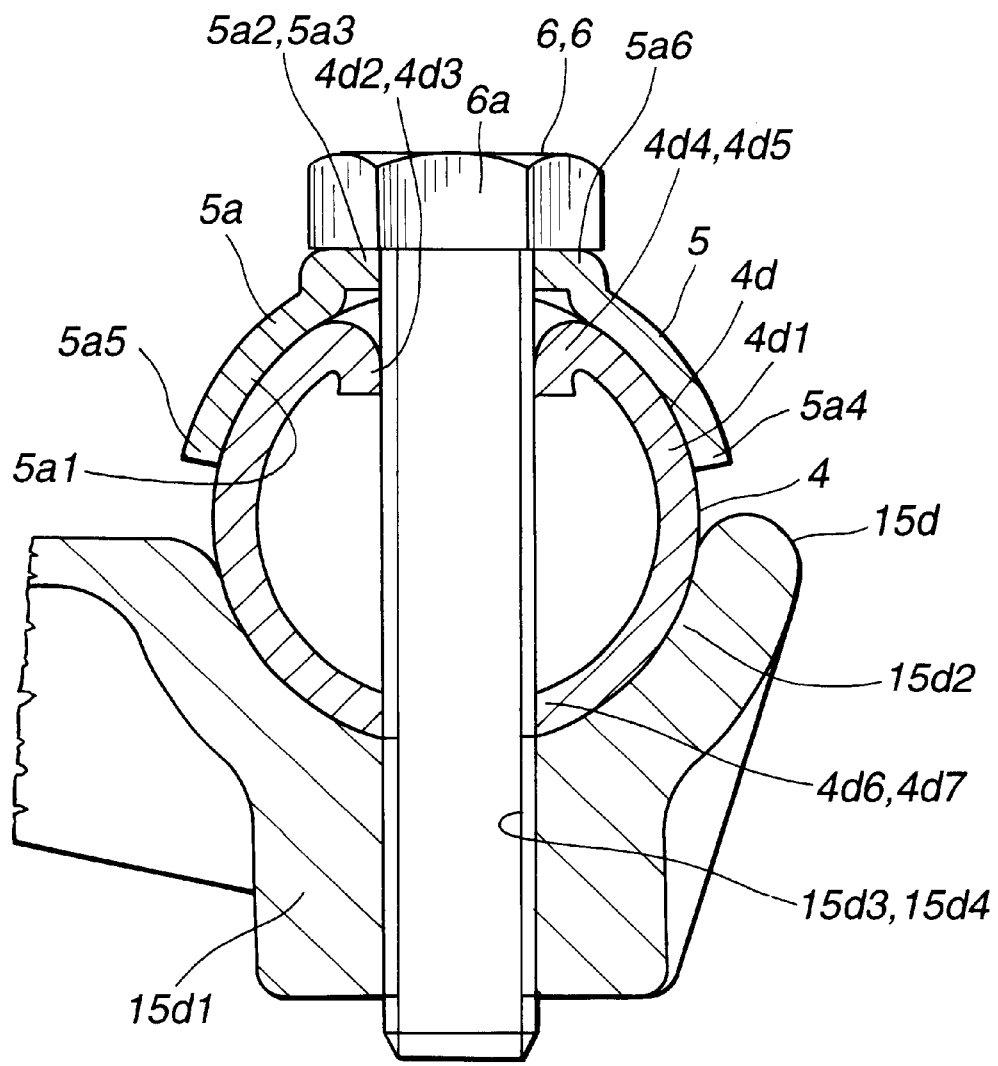
FIG. 4 is a section view illustrating connection between the wiper frame and the gear case of the wiper motor in the wiper unit shown in FIG. 1.

The case-fixing portion 4d is provided with a fixation body 4d1 in a hollow cylindrical shape as shown in FIG. 4, and the fixation body 4d1 is formed with a first screw hole 4d2 and a second screw hole 4d3, respectively. The first and second screw holes 4d2 and 4d3 are through hole in the fixation body 4d1 and disposed in the longitudinal direction of the fixation body 4d1.

The first and second screw holes 4d2, 4d3 are formed with a first screw-holding portion 4d4 and a second screw-holding portion 4d5 having cylindrical inner periphery, respectively on the head side of the screw 6, and further formed with a first round hole 4d6 and a second round hole 4d7, respectively on the top end side of the screw 6.

Figure 6:
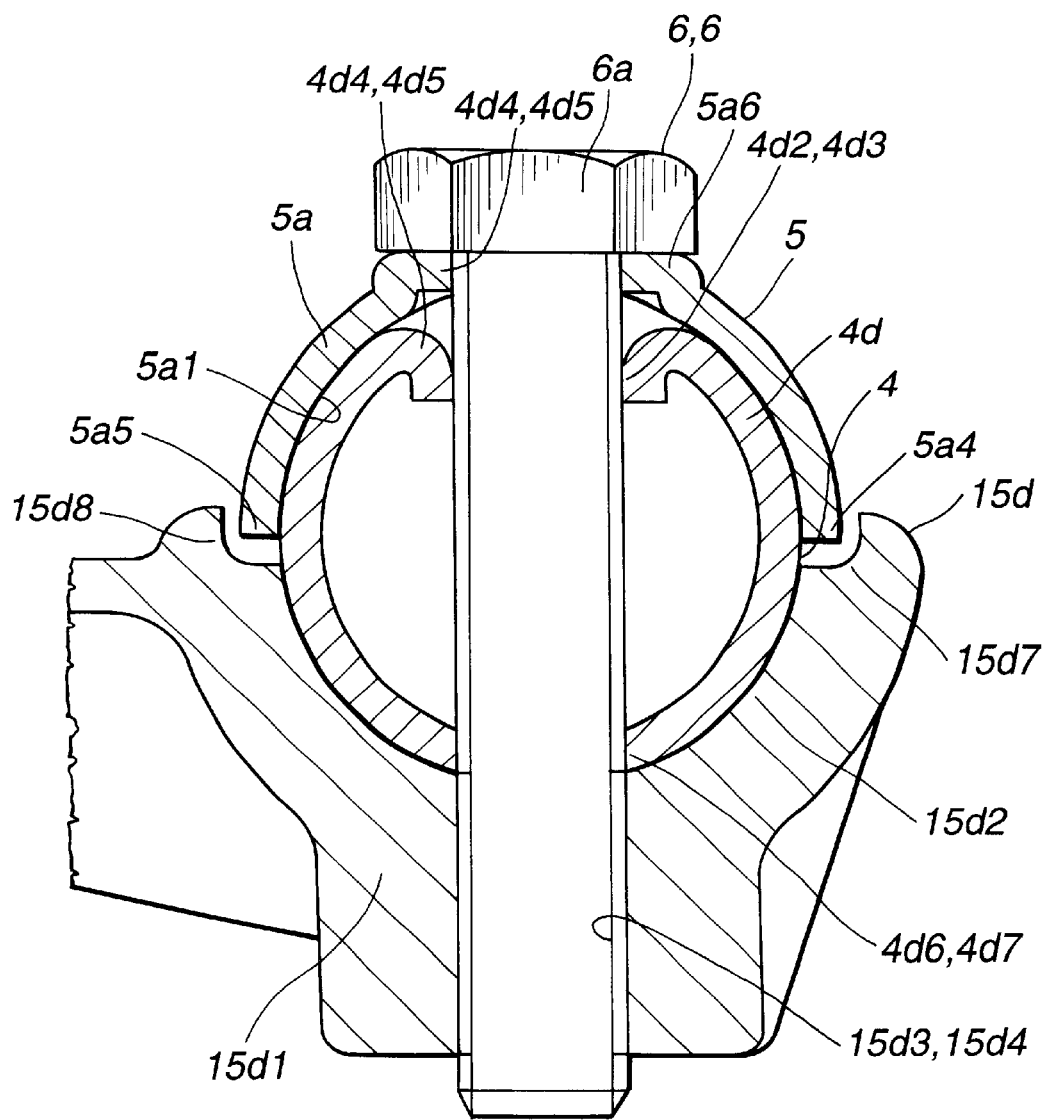
FIG. 6 is a section view illustrating connection between the wiper frame and the gear case of the wiper motor in the wiper unit according to a third embodiment of this invention.

The first and second screw holes 4d2, 4d3 in the case-fixing portion 4d are disposed so as to coincide with the threaded holes 15d3 and 15d4 formed in the frame-holder portion 15d of the gear case 15. It is desirable to form the first and second screw holes 4d2, 4d3 by using the method disclosed in non-examined Japanese Patent Publication Hei No.9-37942 (FIGS. 6 to 8).

The case-fixing portion 4d of the wiper frame 4 is disposed at the frame-holder portion 15d of the gear case 15 of the aforementioned wiper motor 2, and the frame cover 5 is disposed on the case-fixing portion 4d.

The frame cover 5 is provided with a second frame-contact face 5a1 having an inside diameter slightly larger than the outside diameter of the case-fixing portion 4d of the wiper frame 4 on the inside of a cover body 5a formed in a half cylindrical shape as shown in FIG. 4. The second frame-contact face 5a1 approximately forms the full circular shape around the case-fixing portion 4d of the wiper frame 4 together with the first frame-contact face 15d2 formed to the frame-holder portion 15d of the gear case 15.

The cover body 5a of the frame cover 5 is formed with a first screw through hole 5a2 and a second screw through hole 5a3 arranged in the longitudinal direction of the frame-contact face 5a1 in the center of the second frame-contact face 5a1, respectively. The first and second screw through holes 5a2, 5a3 are disposed so as to coincide with the first and second screw holes 4d2, 4d3 formed in the case-fixing portion 4d of the wiper frame 4, and formed in a projection 5a6 sticks out upwardly from the center of the cover body 5a. The projection 5a6 has a flat face and is so designed as to contact with the head 6a of the screw 6 and elastically support the case-fixing portion 4d of the wiper frame 4 against the frame-holder portion 15d of the gear case 15 by tightening the screw 6.

The frame cover 5 is provided with ends 5a4 and 5a5 at the both ends of the frame-contact face 5a1 of the cover body 5a in the circumferential direction. The first and second ends 5a4, 5a5 are located away from the frame-holder portion 15d of the gear case 15 at the time of pressing the frame-contact face 5a1 against the case-fixing portion 4d of the wiper frame 4 contained in the frame-holder portion 15d of the gear case 15.

The first and second screw through holes 5a2, 5a3 of the frame cover 5 are passed through with the screws 6, 6 for securing the wiper frame 4 to the gear case 15. The frame cover 5 is disposed on the upper side of the case-fixing portion 4d of the wiper frame 4 contained in the frame-holding portion 15d of the gear case 15, and the second frame-contact face 5a1 of the frame cover 5 is pressed against the upper face of the case-fixing portion 4bof the wiper frame 4 by tightening the screws 6, 6 into the respective first and second threaded holes 15d3, 15d4 in the frame-holder portion 15d of the gear case 15 after passing the screws 6, 6 through the screw-holding holes 4b4, 4b5 and the round holes 4b6, 4b7 of the first and second screw holes 4b2, 4b3 formed in the case-fixing portion 4d of the wiper frame 4. The second frame-contact face 5a1 of the frame cover 5 is so designed as to cover an upper half portion of the circumference of the case-fixing portion 4d in the longitudinal direction of the case-fixing portion 4d of the wiper frame 4.

According to the tightening of the screws 6, 6 passed through the frame cover 5 and the wiper frame 4 into the first and second threaded holes 15d3, 15d4 formed in the gear case 15, the second frame-contact face 5a1 of the frame cover 5 is pressed against the upper face of the case-fixing portion 4d of the wiper frame 4 and the first frame-contact face 15d2 of the gear case 15 is pressed against the lower face of the case-fixing portion 4d of the wiper frame 4. Accordingly, the compressive load is applied to the case-fixing portion 4d of the wiper frame 4 and the stress is applied so as to enlarge the outside diameter of the case-fixing portion 4d in the lateral direction shown in FIG. 4.

In this time, the frame cover 5 is disposed so that the first and second ends 5a4, 5a5 of the frame cover 5 may be separated from the frame-holder portion 15d of the gear case 15, the first frame-contact face 15d2 covers the lower half of the case-fixing portion 4d by press-contacting with the lower face of the case-fixing portion 4d of the wiper frame 4, and the second frame-contacting face 5a1 covers the upper half of the case-fixing portion 4d by press-contacting with the upper face of the case-fixing portion 4d of the wiper frame 4, therefore the deformation of the case-fixing portion 4d is restrained by the frame cover 5 and the frame-holder portion 15d of the gear case 15, thereby generating resiliency against the compressive stress at the case-fixing portion 4d of the wiper frame 4, the looseness of the screw connection by the screws 6, 6 tightened into the first and second threaded holes 15d3, 15d4 is not caused and the frame cover 5, the wiper frame 4 and the gear case 15 are combined firmly with each other since the resiliency works as a thrust of the screws 6, 6.

The second body-fixation part 4b is secured at one end of the frame body 4a, and the third body-fixation part 4c is secured similarly to the other end of the frame body 4a similarly by caulking.

The second body-fixation part 4b is formed with a first pivot shaft holder 4b1, and the first pivot shaft 9 is supported rotatably in the first pivot shaft holder 4b1.

The first pivot shaft 9 is fixed with a base end of a wiper arm (not shown) at the top end thereof protruding outwardly from a cowl top panel of the vehicle body on the back side of the second body-fixation part 4b shown in FIG. 1. The wiper arm is fitted with a wiper blade (not shown) at the free end thereof. Furthermore, the first pivot arm 8 is fixed to the opposite end of the pivot shaft 9 on the inside of the cowl top panel of the vehicle body on the front side of the body-fixation part 4b shown in FIG. 1.

The first pivot arm 8 is provided with a shaft-securing portion 8a at the base end thereof and formed with a rod-connector portion 8b at the free end thereof. The first pivot arm 8 is fixed with a second ball pin 24 on the front side of the rod-connector portion 8b shown in FIG. 1, and further fixed with a third ball pin 25 on the back side of the rod-connector portion 8b shown in FIG. 1.

The second ball pin 24 is connected with a second ball retainer 26 through a spherical pair. The second ball retainer 26 is fixed to the other end of the first link connecting rod 7. Further, the third ball pin 25 is connected with a third ball retainer 27 through a spherical pair, and the third ball retainer 27 is fixed to one end of the second link connecting rod 10.

The third body-fixation part 4c is formed with a second pivot shaft holder 4c1, and the second pivot shaft 12 is rotatably supported in the second pivot shaft holder 4c1. The second pivot shaft 9 is fixed with a base end of another wiper arm (not shown) at the top end thereof protruding outwardly from the cowl top panel of the vehicle body on the back side of the third body-fixation part 4c shown in FIG. 1. The wiper arm is fitted with another wiper blade (not shown) at the free end thereof. Further, the second pivot arm 11 is fixed to the opposite end of the pivot shaft 12 on the inside of the cowl top panel of the vehicle body on the front side of the body-fixation part 4c shown in FIG. 1.

The second pivot arm 11 is provided with a shaft-securing portion Ha at the base end thereof, and formed with a rod-connector portion 8b at the free end thereof. The second pivot arm 11 is fixed with a fourth ball pin 28 on the back side of the rod-connector portion 11b shown in FIG. 1.

The fourth ball pin 28 is connected with a fourth ball retainer 29 through a spherical pair. The fourth ball retainer 29 is fixed to the opposite end of the second link connecting rod 10.

The wiper unit 1 having the above-mentioned structure is mounted on the vehicle body by screwing the first, second and third body-fixation parts 15c, 4b and 4c to the dash upper panel of the vehicle body, and the wiper arms and the wiper blades are respectively connected to the top ends of the first and second pivot shafts 9 and 12 protruding outwardly from the cowl top panel of the vehicle body.

When an electric current is supplied to the armature 14 of the wiper motor 2 through the external circuit, the motor arm 3 rotates according to the rotation of the armature shaft 17 and the first ball pin 22 starts the circular motion. Whereby, the circular motion of the first ball pin 22 is converted into reciprocating motion of the first link connecting rod 7, the first pivot arm 8 swings reciprocatively and the first pivot shaft 9 turns alternatively. At the same time, the swing motion of the first pivot arm 8 is transmitted to the second pivot arm 11 through the second link connecting rod 10, the second pivot arm 11 swings reciprocatively and the second pivot shaft 12 turns alternatively. According to the alternative turn of the first and second pivot shafts 9 and 12, the respective wiper arms oscillates, thereby wiping the windshield of the motor vehicle with the wiper blades.

Although the compressive load is applied on the case-fixing portion 4d of the wiper frame 4 in the piercing direction of the screw holes 4d2, 4b3 at the time of tightening the screws 6, 6 passed through the frame cover 5 and the wiper frame 4 into the threaded holes 15d3, 15d4 of the gear case 15 as described above, the resiliency against the compressive load is generated in the case-fixing portion 4d of the wiper frame 4 by the frame cover 5 and the frame-holder portion 15d of the gear case 15 and the resiliency works as the thrust of the screws 6, 6. Consequently, the looseness is never caused in the screws 6, 6 screwed into the threaded holes 15d3, 15d4 of the gear case 15 and the wiper frame 4 is combined with the gear case very firmly.

Figure 5:
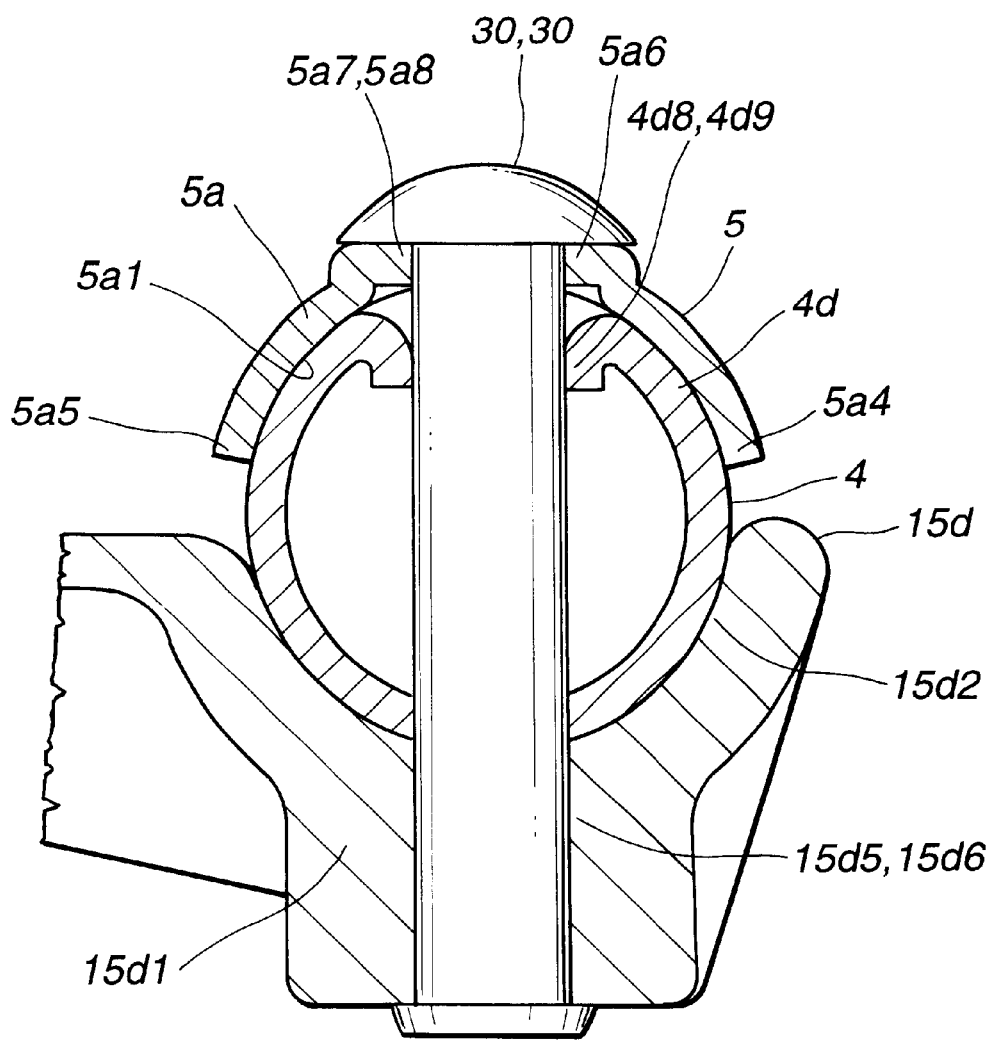
FIG. 5 is a section view illustrating connection between the wiper frame and the gear case of the wiper motor in the wiper unit according to second embodiment of this invention.

A wiper unit according to the second embodiment of this invention is shown in FIG. 5. In the FIG. 5, the connecting structure between the wiper frame 4 and the gear case 15 is merely shown in the wiper unit according to the second embodiment.

In the wiper unit 1 according to this embodiment, rivets 30, 30 are used instead of the screw 6, 6 used in the wiper unit 1 according to the first embodiment. Accordingly, the frame-holder portion 15d of the gear case 15 is formed respectively with a first rivet through hole 15d5 and a second rivet through hole 15d6 instead of the first and second threaded holes 15d3, 15d4, the case-fixing portion 4d of the wiper frame 4 is formed respectively with a first rivet hole 4b8 and a second rivet hole 4b9 instead of the first and second screw holes 4b2, 4b3, and the frame cover 5 is formed with a first rivet through hole 5a7 and a second rivet through hole 5a8 instead of the first and second screw through holes 5a2, 5a3 in the first embodiment. The wiper unit 1 according to this embodiment is composed similarly to the first embodiment excepting the above-mentioned rivets and rivet holes formed in the gear case 15, the wiper frame 4 and the frame cover 5.

The rivets 30, 30 are caulked at the outside portion projected from the gear case 15 after passing the rivets 30, 30 through the first and second rivet through holes 5a7, 5a8 of the frame cover 5, the first and second rivet holes 4b8, 4b9 in the case-fixing portion 4d of the wiper frame 4, and the first and second rivet through holes 15d5, 15d6 in the frame-holder portion 15d of the gear case 15.

Also in this case, although the compressive load is applied on the case-fixing portion 4d of the wiper frame 4 in the passing direction of the rivet holes 4b8, 4b9 similarly to the case of the first embodiment at the time of caulking the rivets 30, 30 passed through the frame cover 5, the case-fixing portion 4b of the wiper frame 4 and the frame-holder portion 15d of the gear case 15, resiliency against the compressive load is generated in the case-fixing portion 4b of the wiper frame 4 by the frame cover 5 and the frame-holder portion 15d of the gear case 15, and the generated resiliency works as the thrust of the rivets 30, 30, whereby the looseness is never caused in the rivets 30, 30 and the wiper frame 4 is combined with the gear case 15 very firmly.

A wiper unit according to the third embodiment of this invention is shown in FIG. 6, and only the connecting structure in the wiper unit according to this embodiment is illustrated in FIG. 6.

In the wiper unit 1 according to the third embodiment, the frame-holder portion 15d of the gear case 15 is formed with a first cutout 15d7 and a second cutout 15d8 for receiving the first and second ends 5a4, 5a5 respectively on the outer side of the ends 5a4, 5a5 of the frame cover 5 in addition to the structure described in the first embodiment. The wiper unit 1 according to this embodiment is composed similarly to the first embodiment excepting the cutouts 15d7, 15d8 formed in the gear case 15.

The first and second cutouts 15d7 and 15d8 have a function to prevent the deformation of the frame cover 5 by engaging with the ends 5a4, 5a5 of the frame cover 5 and restrain the deformation of the case-fixing portion 4b of the wiper frame 4 in the lateral direction when the compressive load is applied on the case-fixing portion 4d by tightening the screws 6, 6 into the threaded holes 15d3, 15d4, through the frame cover 5 and the wiper frame 4.

Accordingly, the frame cover 5 and the wiper frame 4 are prevented from the deformation even if the compressive load is applied to the case-fixing portion 4d of the wiper frame 4 at the time of tightening the screws 6, 6 into the threaded holes 15d3, 15d4 of the gear case 15 through the frame cover 5 and the wiper frame 4, resiliency is generated in the case-fixing portion 4d of the wiper frame 4 against the compressive load and works as the thrust of the screws 6, 6. Consequently, the screw connection by the screws 6, 6 tightened into the threaded holes 15d3, 15d4 is never loosened and the wiper frame 4 is combined very securely. The aforementioned cutouts 15d7, 15d8 may be applied to the wiper unit 1 according to the second embodiment.

As mentioned above, according to the wiper unit of this invention, the wiper frame is secured to the gear case by, for example, the screw or the rivet in a state where the case-fixing portion of the frame body is supported in the frame-holder portion of the gear case. In this time, the wiper frame is directly fixed to the gear case without using an intermediate member such as a bracket, and supported in a state of closely contact with the frame-holder portion having the semi-circular cross section and the resiliency against the compressive load caused by tightening the screw or caulking the rivet is given to the screw or the rivet, therefore the wiper frame is fixed firmly without looseness. An excellent effect can be obtained in that it is possible to combine the wiper frame to the wiper motor very firmly without looseness.

In the wiper unit according to another embodiment, the wiper unit is further provided with the frame cover and the wiper frame is secured between the frame cover and the frame-holder portion of the gear case in the state where the whole circumference of the case-fixing portion is substantially covered by the frame cover and the frame-holder portion. Therefore, another excellent effect can be obtained in that it is possible to combine the wiper frame to the gear case of the wiper motor more firmly according to the larger resiliency generated by the frame cover and the frame-holder portion of the gear case.

According to the wiper unit of the other embodiment of this invention, the frame cover is secured on the case-fixing portion of the wiper frame in the state where the both ends of the frame cover are slightly separated from the frame-holder portion of the gear case, therefore the frame cover is never come contact with the gear case and it is possible to work the resiliency of the wiper frame more efficiently and possible to strengthen the combination between the wiper frame and the gear case of the wiper motor.

In the wiper unit according to the other embodiment of this invention, the cutouts are formed in the frame-holder portion of the gear case and so designed as to receive the respective ends of the frame cover at the time of fixing the wiper frame to the gear case together with the frame cover. A further excellent effect can be obtained that it is possible to restrain the deformation of the wiper frame by the engagement of the both ends of the frame cover with the cutouts of the gear case and the resiliency in the wiper frame becomes larger.

What is claimed is:

1. A wiper unit for wiping a windshield of a vehicle, comprising:

a wiper motor provided with an armature rotating in a motor yoke, a gear case secured to said motor yoke, and an output shaft connected with said armature through a reduction gear;

a motor arm fixed to the output shaft of said wiper motor;

a wiper frame having a tubular shaped frame body, a body-fixation part to be fixed to the vehicle body at an end of said frame body and a pivot shaft holder;

a frame cover fixed to said wiper frame;

a pivot shaft rotatably supported by the pivot shaft holder of said wiper frame;

a pivot arm secured to said pivot shaft; and a link connecting rod connected with said motor arm and said pivot arm, respectively; wherein said frame body of the wiper frame is provided with a case-fixing portion formed with a first and a second hole passing through said frame body;

said gear case of the wiper motor is provided with a frame-holder portion formed with a third hole and having a semi-circular cross section to be fitted with said case-fixing portion of the wiper frame for supporting said wiper frame at the case-fixing portion;

said frame cover is fixed on said case-fixing portion of the wiper frame; and said wiper frame is secured to said gear case of the wiper motor together with said frame cover by tightening a screw passed through the first and second holes formed in said case-fixing portion of the wiper frame into the third hole formed in said frame-holder portion of the gear case to substantially cover the whole circumference of said case-fixing portion with said frame cover and said frame-holder portion of the gear case.

2. A wiper unit for wiping a windshield of a vehicle, comprising:

a wiper motor provided with an armature rotating in a motor yoke, a gear case secured to said motor yoke, and an output shaft connected with said armature through a reduction gear;

a motor arm fixed to the output shaft of said wiper motor;

a wiper frame having a tubular shaped frame body, a body-fixation part to be fixed to the vehicle body at an end of said frame body and a pivot shaft holder;

a frame cover fixed to said wiper frame;

a pivot shaft rotatably supported by the pivot shaft holder of said wiper frame;

a pivot arm secured to said pivot shaft; and a link connecting rod connected with said motor arm and said pivot arm, respectively; wherein said frame body of the wiper frame is provided with a case-fixing portion formed with a first and a second hole passing through said frame body;

said gear case of the wiper motor is provided with a frame-holder portion formed with a third hole and having a semi-circular cross section to be fitted with said case-fixing portion of the wiper frame for supporting said wiper frame at the case-fixing portion;

said frame cover is fixed on said case-fixing portion of the wiper frame; and said wiper frame is secured to said gear case of the wiper motor together with said frame cover by tightening a screw passed through the first and second holes formed in said case-fixing portion of the wiper frame into the third hole formed in said frame-holder portion of the gear case to cover the whole circumference of said case-fixing portion with said frame cover and said frame-holder portion of the gear case in a state where both ends of said frame cover are slightly separated from the frame-holder portion of said gear case.

3. A wiper unit for wiping a windshield of a vehicle, comprising:

a wiper motor provided with an armature rotating in a motor yoke, a gear case secured to said motor yoke, and an output shaft connected with said armature through a reduction gear;

a motor arm fixed to the output shaft of said wiper motor;

a wiper frame having a tubular shaped frame body, a body-fixation part to be fixed to the vehicle body at an end of said frame body and a pivot shaft holder:

a frame cover fixed to said wiper frame;

a pivot shaft rotatably supported by the pivot shaft holder of said wiper frame;

a pivot arm secured to said pivot shaft; and a link connecting rod connected with said motor arm and said pivot arm, respectively; wherein said frame body of the wiper frame is provided with a case-fixing portion formed with a screw hole passing through said frame body;

said gear case of the wiper motor is provided with a frame-holder portion formed with a threaded hole and having a semi-circular cross section to be fitted with said case-fixing portion of the wiper frame for supporting said wiper frame at the case-fixing portion;

said frame cover is fixed on said case-fixing portion of the wiper frame; and said wiper frame is secured to said gear case of the wiper motor together with said frame cover by tightening a screw passed through the screw hole formed in said case-fixing portion of the wiper frame into the threaded hole formed in said frame-holder portion of the gear case to cover the whole circumference of said case-fixing portion with said frame cover and said frame-holder portion of the gear case in a state where both ends of said frame cover are slightly separated from the frame-holder portion of said gear case.

* * * * *